(12) United States Patent
Plate

(10) Patent No.: US 6,279,199 B1
(45) Date of Patent: Aug. 28, 2001

(54) VERTICALLY ADJUSTABLE CASTER

(75) Inventor: Jack R. Plate, Somerset, MI (US)

(73) Assignee: Ross Design & Engineering, Inc., Somerset, MI (US)

( * ) Notice: Subject to any disclaimer, the term of this patent is extended or adjusted under 35 U.S.C. 154(b) by 0 days.

(21) Appl. No.: 09/592,832

(22) Filed: Jun. 13, 2000

(51) Int. Cl.$^7$ .................................................. B60B 33/04
(52) U.S. Cl. ........................................ 16/19; 16/44; 16/34
(58) Field of Search ................................. 16/19, 32, 33, 16/34, 35 D, 44, 105, 29, 31 R, 31 A; 248/188.2; 280/47.12, 47.15

(56) References Cited

U.S. PATENT DOCUMENTS

| 2,894,761 | * | 7/1959 | Knarzer | 16/19 |
| 4,372,569 | * | 2/1983 | Otterson | 16/44 |
| 4,685,174 | * | 8/1987 | Hager | 16/44 |
| 4,763,910 | * | 8/1988 | Brandli et al. | 16/44 |
| 5,347,680 | * | 9/1994 | Rippe | 16/19 |
| 5,400,469 | * | 3/1995 | Simonsen | 16/44 |
| 5,581,843 | * | 12/1996 | Purnell | 16/35 R |

FOREIGN PATENT DOCUMENTS

| 59-48202-A | * | 3/1984 | (JP) . |
| WO-94/ 16599-A1 | * | 8/1994 | (WO) . |

* cited by examiner

Primary Examiner—Chuck Y. Mah
(74) Attorney, Agent, or Firm—Young & Basile, P.C.

(57) ABSTRACT

A heavy duty vertically adjustable spring biased caster comprising a caster wheel mounted upon a pivot shaft within a frame. The pivot shaft is vertically adjustable upon the frame and a spring cradle mounted upon the wheel support pivot shaft and vertically adjustable therewith permits a uniform biasing force to be imposed upon the caster wheel support regardless of the vertical position of the caster wheel within the frame.

10 Claims, 3 Drawing Sheets

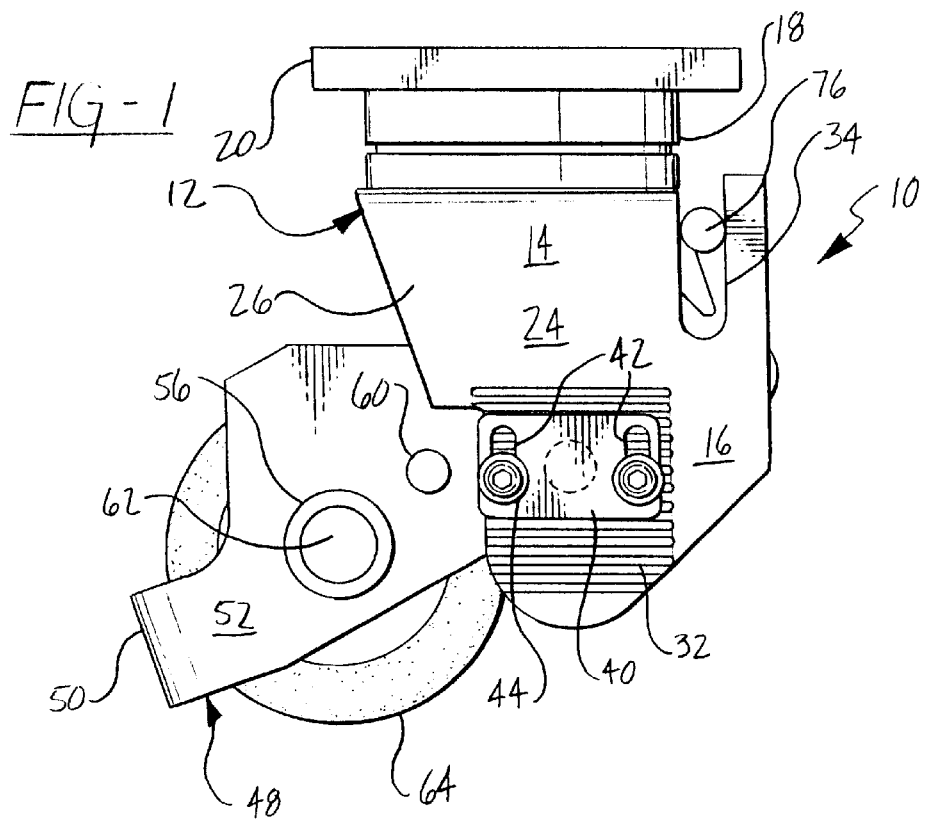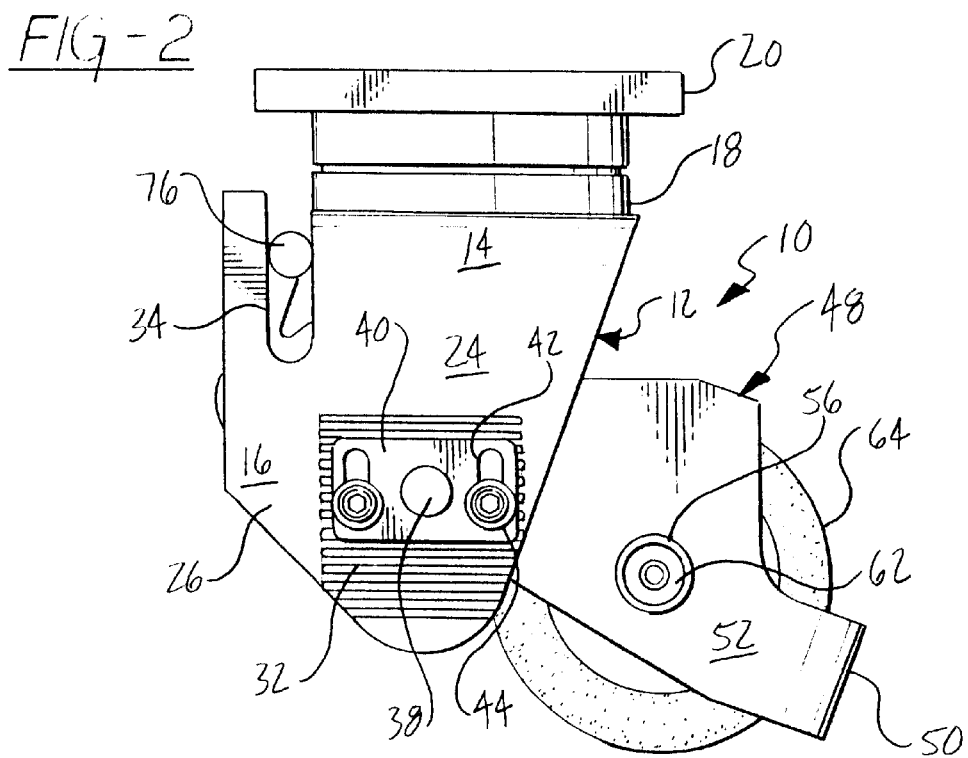

VERTICALLY ADJUSTABLE CASTER

BACKGROUND OF THE INVENTION

1. Field of the Invention

The invention pertains to spring biased caster wheels capable of vertical adjustment wherein a uniform biasing force is maintained on the caster wheel regardless of its vertical adjustment.

2. Description of the Related Art

Caster wheels capable of vertical adjustment with respect to the supporting frame are known, but if the caster wheel is to be spring biased or suspended, difficulty is encountered in producing a uniform biasing force on the caster wheel regardless of its vertical position.

In hand operated fork lifts, for instance, spring biased heavy duty caster wheels are employed. It is desirable to permit such caster wheels to be vertically positionable for a number of reasons, including wheel wear and floor clearance, but it is important that the spring biasing force on the caster wheel be uniform regardless of the caster wheel vertical position. In known spring biased caster wheel constructions, difficulty has been encountered in maintaining a uniform biasing force on the caster wheel as the vertical position of the wheel is adjusted.

Because of the concise configuration of caster wheels, it is difficult to incorporate spring biasing means within the caster wheel which will provide a uniform biasing force regardless of the wheel vertical position. With such types of casters, uniformity and control of biasing forces is usually sacrificed if vertical adjustment is desired.

OBJECTS OF THE INVENTION

It is an object of the invention to provide a heavy duty spring biased caster wheel capable of vertical adjustment upon its supporting frame.

Another object of the invention is to provide a heavy duty spring biased caster wheel vertically adjustable upon its frame wherein the spring biasing force characteristics are uniform regardless of the vertical position of the caster wheel upon its frame.

Yet a further object of the invention is to provide a heavy duty vertically adjustable spring biased caster wheel having uniform biasing characteristics regardless of its vertical position and wherein forces imposed upon caster structure are balanced and equalized.

SUMMARY OF THE INVENTION

A heavy duty caster wheel in accord with the invention is mounted upon a frame having an upper region attached to the structure being supported by the caster, and such mounting structure often includes rotatable bearings permitting the frame to be rotated about a vertical axis so that the caster wheel may orient itself to the direction of movement of the structure which it is supporting.

The lower region of the caster frame consists of a pair of parallel spaced side plates. A primary pivot shaft extends through vertically defined slots in the frame side plates and the pivot shaft extends through the side plate slots into supporting blocks adjustably mounted upon the outer side of the frame side plates. In this manner, the pivot shaft is vertically positionable with respect to the frame.

A caster wheel support of a U-configuration is located between the frame side plates and is pivotally mounted upon the pivot shaft. A caster wheel is rotatably mounted upon the caster wheel support upon an axle radially spaced from the pivot shaft and vertical pivotal movement of the caster wheel results from pivoting of the caster wheel support on the pivot shaft.

A spring cradle is located between the frame side plates and is also pivotally mounted upon the pivot shaft for vertical adjustment therewith. The spring cradle includes torque restraint means which restrain the spring cradle against pivotal movement on the pivot shaft, and compression springs interposed between the spring cradle and the caster wheel support produce a biasing force on the caster wheel support tending to pivot the caster wheel support, and caster wheel, in a direction for engaging the caster wheel with the floor or caster wheel supporting surface.

The spring cradle is restrained against pivoting on the pivot shaft by a bar affixed to the spring cradle radially spaced from the pivot shaft. The ends of the bar constitute studs which are slidably received within vertically oriented grooves or slots defined in the frame side plates. Accordingly, the slidable movement of the studs within the grooves permits the pivot shaft and spring cradle to be vertically positioned as desired, but the grooves prevent the spring cradle from pivoting upon the pivot shaft due to the biasing forces of the compression springs. Accordingly, as the location of the ends of the compression springs relative to the spring cradle and the caster wheel support do not change even though the pivot shaft is vertically adjusted on the frame side plates, the biasing force on the caster wheel will remain uniform regardless of the caster wheel's vertical adjustment.

The blocks receiving the ends of the pivot shaft include vertical slots receiving bolts whereby the blocks may be vertically adjusted upon the adjacent frame side plate outer surface. To enhance the frictional engagement between the pivot shaft supporting blocks and the side plates, a plurality of serrations forming grooves and tongues are formed on the side plate outer side and the inner side of the blocks wherein tightening of the screws will intermesh the tongue and grooves to produce a high strength adjusted position of the pivot shaft. Of course, other types of supports and threaded adjustments can be used to support the ends of the pivot shaft relative to the frame side plates.

The wheel support and spring cradle are all located within the confines of the frame side plates, and a caster construction in accord with the invention is capable of withstanding a high degree of abuse without significant damage, and the vertical adjustment of the pivot shaft permits the caster wheel to be accurately vertically adjusted relative to the caster frame, and yet the predetermined spring characteristics of the caster wheel will be maintained regardless of the vertical adjustment of the caster wheel.

BRIEF DESCRIPTION OF THE DRAWINGS

The aforementioned objects and advantages of the invention will be appreciated from the following description and accompanying drawings wherein:

FIG. 1 is a side elevational view of a vertically adjustable heavy duty caster in accord with the inventive concepts as taken from the right side of the caster, FIG. 2 is a side elevational view of the left side of the assembled caster.

DESCRIPTION OF THE PREFERRED EMBODIMENT

Figure 3:
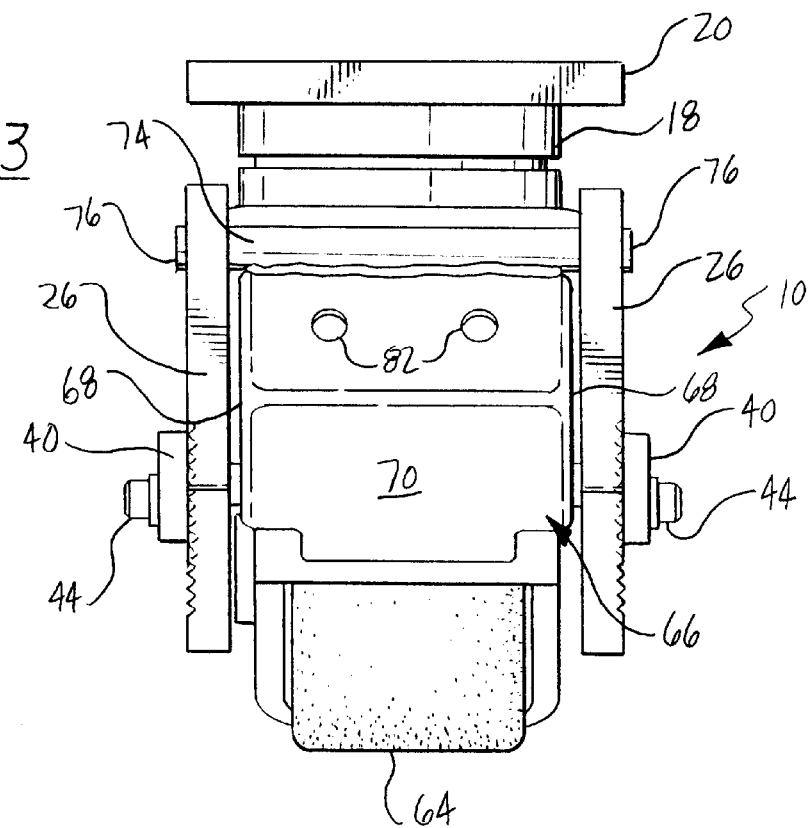
FIG. 3 is a rear elevational view of the caster.

With reference to the drawings, the vertically adjustable caster in accord with the invention is generally indicated at 10, and the primary component comprises a frame 12 having an upper region 14 and a lower region 16.

A bearing 18 is mounted upon the upper region of the frame 12, of the usual caster type, and the bearing includes a mounting plate 20 whereby the caster 10 may be mounted upon the underside of the structure, not shown, supported by the caster. The frame 12 pivots about the vertical axis of the bearing 18, and in most instances, a plurality of casters 10 will be used to support the structure mounted thereon. The caster of the invention, because it has a low vertical profile, is vertically adjustable, and is capable of heavy duty use, is used of advantage in small fork lift devices.

Figure 4:
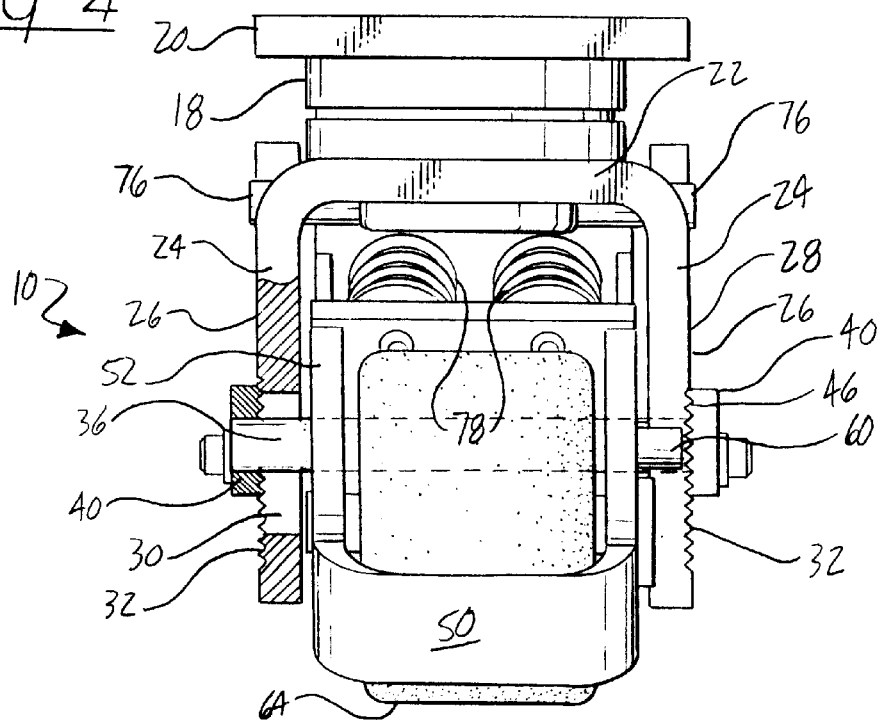
FIG. 4 is a front elevational view, a portion of the right side plate being shown in section.
Figure 5:
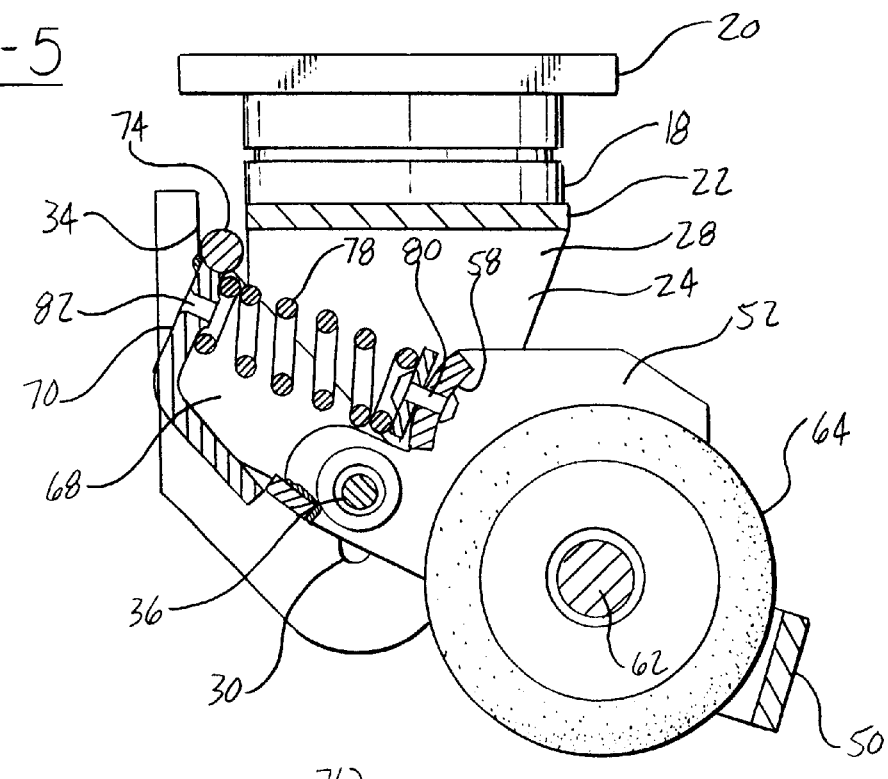
FIG. 5 is an elevational sectional view as taken through the pivot shaft to illustrate the configuration of the spring cradle.

The frame 12 is formed of heavy steel plate material into an inverted U-configuration, as will be noted from FIG. 4. The frame includes a base 22 at its upper region upon which the bearing 18 is mounted, and the lower region 16 is defined by a pair of spaced vertically disposed side plates 24 of similar configuration. Each of the side plates 24 includes an outer side 26 and an inner side 28. A vertically disposed slot 30, FIGS. 4 and 5, is defined in each of the side plates 24 extending therethrough as to intersect sides 26 and 28 for receiving the pivot shaft as later described. Adjacent the slots 30, upon the side plates' outer side 26, a plurality of horizontally uniformly vertically spaced serrations 32 are defined which form a plurality of tongues and grooves 34, FIG. 4.

A pivot shaft 36 extends through the frame side plates 24 having shaft ends 38. The shaft ends 38 are each received within a side plate slot 30, and are of such a length as to extend beyond the side plates' outer sides 26. Adjustment blocks 40 are provided with cylindrical bores for receiving the pivot shaft ends 38, and a pair of vertically disposed slots 42 are defined in each of the blocks 40 as will be appreciated from FIGS. 1 and 2. Threaded bolts or screws 44 are received within the blocks' slots 42 and thread within threaded holes defined in the side plates 24. A plurality of serrations 46 are defined on the inner side of the blocks 40, and as the serrations 46 are complementary in configuration to the side plate serrations 32 and tongue and grooves 34, the blocks 40 may be vertically adjusted on the side plates 24, and tightening of the screws 44 firmly interlocks the serrations of the blocks 40 with the side plate serrations 32 permitting a high strength vertical adjustment positioning of the pivot shaft 36 upon the frame 12.

A caster wheel support 48 is located intermediate the frame side plates 24. The configuration of the caster wheel support 48 is best appreciated from FIG. 6. The support 48 is formed of plate material and includes a bridge 50 interconnecting parallel spaced walls 52. The walls 52 include holes 54 concentrically related to cylindrical bearings 56, FIG. 6, for receiving the caster axle as later described. A spring anchor plate 58 is welded to the walls 52 and extends therebetween, and a stop stud 60 is mounted upon one of the walls 52 for engagement with the edge of the frame 12 to limit pivoting of the caster wheel support under extreme load conditions.

A caster axle 62 is received within the support holes 52 and bearings 56, and the axle 62 supports the caster wheel 64 located between the walls 52. The caster wheel 64 may be formed of metal, but is usually constructed of a high density synthetic material such as urethane or the like. As will be appreciated from FIGS. 1, 2 and 5, the caster wheel support bridge 50 serves to protect the rearward extending portion of the wheel.

The pivot shaft 36 extends through the caster wheel support walls 52, and the support 48 is pivotally mounted upon the shaft 36 whereby the support 48 is capable of pivoting in a vertical direction about the shaft 36 and is vertically positioned with the pivot shaft.

Figure 6:
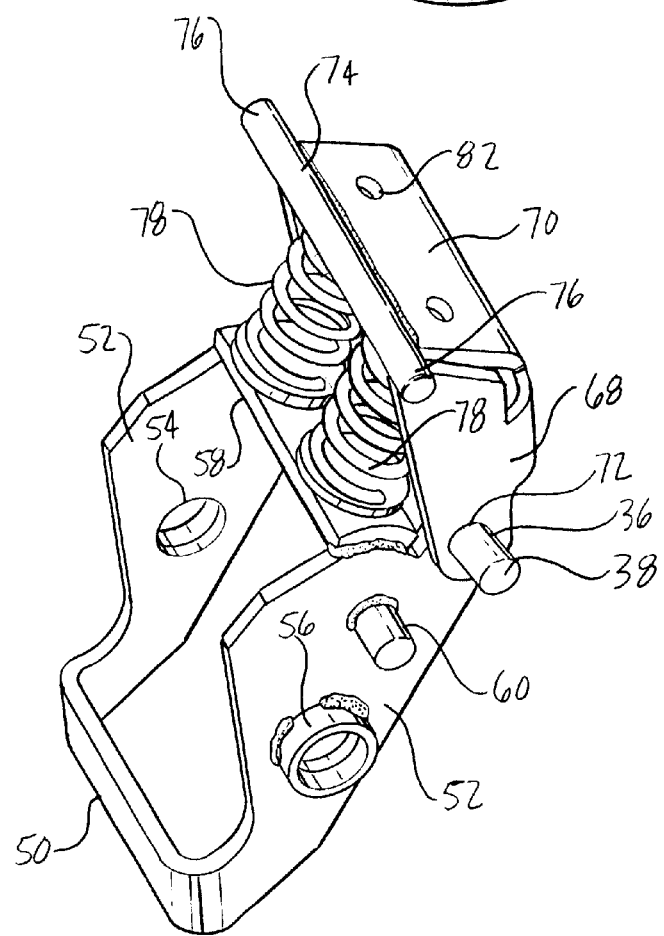
FIG. 6 is a perspective view of the wheel support and spring cradle as mounted upon the pivot shaft, the caster wheel being not shown for purpose of clarity.

The spring biasing force imposed upon the caster wheel support 48 and wheel 64 is accomplished through the spring cradle 66 which is also pivotally mounted upon the pivot shaft 36. The spring cradle 66, best illustrated in FIGS. 5 and 6, is formed of a sheet metal stamping and includes spaced parallel sides 68. The spring cradle 66 also includes a base 70 extending between the sides 68 which is turned upwardly as will be appreciated from FIG. 5. Pivot shaft openings 72 defined in the sides 68 receive the pivot shaft 36 wherein the spring cradle 66 is also vertically positioned with the pivot shaft 36.

At its upper edge, the spring cradle base 70 has a cylindrical bar 74 welded thereto, and the bar 74 is of a greater width than the base 70 wherein the bar ends 76 extend beyond the width of the spring cradle for reasons explained below.

A pair of heavy duty compression springs 78 are interposed between the caster wheel support 48 and the spring cradle 66, as shown in FIGS. 5 and 6. The lower end of the springs 78 are mounted by anchors 80 to the caster wheel support spring anchor plate 58, while the upper end of the springs 78 are attached to the spring cradle base 70 slightly below the bar 74.

The caster 10 is assembled in the manner shown in the drawings. The caster wheel support 48 is located between the frame side plates 24 upon the pivot shaft 36. In a similar manner, the spring cradle 66 is also pivotally mounted upon the pivot shaft 36 as the spring cradle sides 68 straddle the wheel support walls 52, FIG. 6.

The spring cradle bar 74 is located within the frame grooves 34 in that the bar ends 76 are of sufficient length as to permit their reception within the grooves 34. Accordingly, while the grooves 34 permit the bar 74 to be vertically adjusted therein, the grooves 34 prevent the spring cradle from pivoting upon the pivot shaft 36 and the relationship between the bar ends 76 and grooves 34 constitute a torque restraint upon the spring cradle 66.

Because the caster wheel support spring anchor plate 58 is radially spaced from the pivot shaft 36, FIG. 5, the biasing force imposed upon the wheel support 48 by the springs 78 tends to pivot the wheel support 48 in a clockwise direction about shaft 36, FIG. 5, wherein the springs 78 will support the weight imposed upon the caster wheel 64.

Vertical adjustment of the caster wheel 64 to the frame 12 is accomplished by unloosening the screws 44 and positioning the adjustment blocks 40 in a vertical direction relative to the associated side plates 24. As the caster wheel support 48 and the spring cradle 66 are both mounted upon the pivot shaft 36, these components will simultaneously be vertically adjusted together. Tightening of the screws 44 to interlock the serrations 32 and 46 of the adjustment blocks 40 and the frame side plates 24 will firmly vertically position the pivot shaft 36 and its associated components.

As the frame grooves 34 are vertically disposed, vertical adjustment of the pivot shaft 36, the wheel support 48 and the spring cradle 66 with the pivot shaft 36 is unhindered. However, because of the vertical orientation of the grooves 34, the biasing force imposed upon the spring cradle 66 by the springs 78, in a counter-clockwise direction about pivot shaft 36 as viewed in FIG. 5, is prevented by reception of the bar ends 76 in the grooves 34. Accordingly, it will be appreciated that a heavy duty spring biased caster constructed in accord with the invention may be of a relatively concise configuration, the critical components such as the springs are encased within structure and protected, and the vertical position of the caster wheel may be adjusted without changing the spring biasing characteristics of the caster as predetermined by the compression springs.

It is appreciated that various modifications to the inventive concepts may be apparent to those skilled in the art without departing from the spirit and scope of the invention.

What is claimed is:

1. A heavy duty vertically adjustable spring biased caster comprising, in combination, a caster frame having an upper region and a lower region, caster mounting structure affixed to said frame upper region for attaching said frame to the member being supported by the caster, said frame lower region including spaced vertically disposed side plates each having outer and inner sides, a horizontally disposed pivot shaft extending between and through said side plates, pivot shaft adjustment means mounted on said plates' outer sides supporting said pivot shaft for selected vertical adjustment on said side plates, a caster wheel support pivotally mounted on said pivot shaft, a caster wheel rotatably mounted on said support having an axis substantially parallel to said pivot shaft and radially spaced therefrom, a spring cradle mounted on said pivot shaft, torque restraint means interposed between said spring cradle and said caster frame preventing rotation of said cradle on said shaft and permitting vertical adjustment of said cradle with said pivot shaft, and spring means interposed between said caster wheel support and said spring cradle biasing said wheel support about said shaft in a direction to engage said caster wheel with a supporting surface, vertical adjustment of said pivot shaft simultaneously vertically adjusting said caster wheel support, caster wheel, spring cradle and spring means.

2. A heavy duty vertically adjustable caster as in claim 1, said caster wheel support and said spring cradle being located between said frame side plates' inner sides.

3. A heavy duty vertically adjustable caster as in claim 2, said caster wheel support being of a U-configuration having spaced walls, said caster wheel being located between said walls having an axis shaft mounted on said walls.

4. A heavy duty vertically adjustable caster as in claim 1, a vertically disposed slot defined in each of said frames' side plates intersecting said outer and inner sides, said pivot shaft having ends extending through and beyond said slots, said pivot shaft adjustment means including a block receiving each pivot shaft end and located adjacent a frame side plate outer side, and block adjustment means selectively vertically positioning said blocks upon the adjacent plate outer side to vertically position said pivot shaft.

5. A heavy duty vertically adjustable caster as in claim 4, said block adjustment means including threaded fasteners.

6. A heavy duty vertically adjustable caster as in claim 5, said blocks including vertically disposed slots defined therein and said threaded fasteners extending through said blocks' slots and being threaded into said adjacent frame side plate to permit vertical adjustment of said blocks on said side plates' outer sides to vertically position said pivot shaft.

7. A heavy duty vertically adjustable caster as in claim 6, friction enhancing means defined on said plates' outer sides and said blocks interlocking together upon tightening of said threaded fasteners.

8. A heavy duty vertically adjustable caster as in claim 7, said friction enhancing means comprising serrations having vertically spaced tongue and grooves.

9. A heavy duty vertically adjustable caster as in claim 1, said torque restraint means interposed between said spring cradle and said caster frame comprising an extension mounted on said cradle remotely from said pivot shaft and a vertically extending groove defined in at least one of said frame side plates slidably receiving said extension whereby said extension is vertically adjustable along said groove as said pivot shaft is vertically adjusted and said groove and extension prevents rotation of said spring cradle at all vertical positions of said pivot shaft.

10. A heavy duty vertically adjustable caster as in claim 9, said extension comprising the end of a bar affixed to said spring cradle, said bar having two ends each defining an extension, a vertically extending groove defined in each caster side plate, each groove slidably receiving a bar end.

* * * * *